US007542022B2

(12) United States Patent
Park

(10) Patent No.: US 7,542,022 B2
(45) Date of Patent: Jun. 2, 2009

(54) FLAT PANEL DISPLAY CAPABLE OF DIGITAL DATA TRANSMISSION

(75) Inventor: Jin-Ho Park, Kyongki-do (KR)

(73) Assignee: Samsung Electronics Co., Ltd. (KR)

( * ) Notice: Subject to any disclaimer, the term of this patent is extended or adjusted under 35 U.S.C. 154(b) by 536 days.

(21) Appl. No.: 11/289,392

(22) Filed: Nov. 30, 2005

(65) Prior Publication Data

US 2006/0077160 A1 Apr. 13, 2006

Related U.S. Application Data

(63) Continuation of application No. 09/886,028, filed on Jun. 22, 2001, now Pat. No. 6,977,647.

(30) Foreign Application Priority Data

Jul. 27, 2000 (KR) .............................. 2000-43404

(51) Int. Cl.
*G06F 3/038* (2006.01)
*G09G 3/20* (2006.01)
*G09G 3/36* (2006.01)

(52) U.S. Cl. ............................ 345/98; 345/55; 345/204

(58) Field of Classification Search ........... 345/55–100, 345/204–214, 690–697
See application file for complete search history.

*Primary Examiner*—David L Lewis
(74) *Attorney, Agent, or Firm*—Haynes & Boone, LLP.

(57) ABSTRACT

A flat panel display is provided in which a controller generates gamma data digitized for each gradation and transmits the same to column driver Ics, which then generate gradation voltage by using gamma data and output column signals. Here, the gamma data can be transmitted in TTL system or differential signal transmission system.

Thus, the number of transmission lines can be reduced since column driver ICs generate the gradation voltage by utilizing gamma data produced from the controller and output a column signal. As a consequence, a control board can be configured in an easy manner while at the same time reducing manufacturing costs. Further, a high precision image representation, low power consumption, and high speed data transmission can be obtained while at the same time eliminating EMI trouble.

17 Claims, 5 Drawing Sheets

FLAT PANEL DISPLAY CAPABLE OF DIGITAL DATA TRANSMISSION

CROSS REFERENCE TO PRIOR APPLICATIONS

This application is a Continuation Application from a U.S. patent application Ser. No. 09/886,028 filed on Jun. 22, 2001 and issued as U.S. Pat. No. 6,977,647, which claims priority to and the benefit of Korean Patent Application No. 2000-43404 filed on Jul. 27, 2000, which are all hereby incorporated by reference for all purposes as if fully set forth herein.

BACKGROUND OF THE INVENTION

1. Field of the Invention

The present invention relates to a flat panel display, and more particularly, to a flat panel display that transmits gray scale value as data, to a column driver circuit, which then digitize them into gamma data, so that column signals can be selected by matching thus-converted analog signal to R, G, B data.

2. Description of the Related Art

Recently, there has been a significant development in flat panel display devices adopting liquid crystal display device or plasma display panel technology. And flat panel displays such as liquid crystal displays or plasma displays adopted for applications, such as computer monitors and televisions, are marketed and commonly available.

Specifically, liquid crystal displays for displaying images utilizing electrical and optical characteristics of liquid crystal become to have screens large in size with high resolution. Liquid crystal displays are configured in that a liquid crystal display panel, i.e., a flat panel for displaying images, a control board and an optical module are assembled to a display module which then is mounted into a case.

Typically, circuits mounted to such display module consist of a controller, power unit, gate voltage generating unit, gradation voltage generating unit, column driver ICs and scan driver ICs. As display devices have large size screens, solutions for EMI trouble, noise problem caused by transmitting media, and high resolution related to restriction in data transmission become absolute necessities.

In order to overcome EMI trouble, while at the same time accomplishing high speed data transmission with low power consumption, a method of transmitting, in a differential signal, video signals including data is proposed. In detail, data transmission technique adopting differential signaling method such as LVDS (low voltage differential signaling), RSDS (reduced swing differential signaling), or TMDS (time minimized differential signaling) system is disclosed, and a study on such technique is in progress.

However, such techniques still suffer drawbacks in that a lot of wires are connected between a control board and a column driver in a display module. These wires transmit R, G, B data, gradation voltage, column control signal and scan control signal. When R, G, B data are represented in 6-bits per color, 18-bits color data are transmitted. To this end, when data transmission is carried out in TTL (transistor-transistor logic) system, 18 wires are required to arranged at a column driver IC, and wires for transmitting column or scan control signals are added. When color data are represented in 6-bits in order to express column signals in each gradation, gradation voltage for expressing 64 gradations has to be supplied to the column driver IC. Further, when bipolarity is taken into consideration, wires for supplying gradation voltage for 128 gradation are needed between the gradation voltage generating unit and the column driver IC.

Such a wire requirement for data transmission can be decreased significantly if data transmission method is changed from TTL system into the above-mentioned differential signaling system. However, there still exists a need for a method of decreasing wires for gradation voltage and minimizing mounting area of control board. As one of the solutions for these matters, multi-layer PCBs are employed. However, it is not cost effective.

As for gradation voltage, it is difficult to obtain a correct gradation value when an image is formed at a screen since the gradation voltage is influenced by the wire resistance while the gradation voltage is applied from the gradation voltage generating unit to each of column driver ICs. Further, complementary circuits for compensating such drawbacks are additionally required.

SUMMARY OF THE INVENTION

It is therefore an object of the present invention to digitize the value for gradation, convert the digitized value into gamma data, transmit the converted gamma data to a column driver IC, and output a column signal.

It is another object of the present invention to transmit gamma data mixed with or separated from R, G, B data for expressing images, and to utilize a column driver IC in extracting the transmitted gamma data and outputting column signal.

It is still another object of the present invention to encode gamma data along with R, G, B data in differential signaling system and transmit the encoded data to a column driver IC, and to utilize a column driver IC in extracting the decoded gamma data and outputting a column signal.

To accomplish the object of the present invention, there is provided a flat panel display including a power unit for supplying constant voltage to each unit; a gate voltage generating unit for generating and outputting gate on/off voltage; a controller for generating a scan control signal and a column control signal, controlling and outputting timing format of R, G, B data, and generating gamma data having a plurality of values for gradation; scan driver ICs for outputting a scan signal utilizing the scan control signal and the gate on/off voltage; column driver ICs for converting the gamma data into an analog gradation voltage, and outputting a column signal utilizing the column control signal, R, G, B data and gradation voltage; and a flat display panel for displaying a predetermined image.

Preferably, the controller is configured to transmit a plurality of R, G, B data and a plurality of gamma data to the column driver through different transmission lines, or to transmit R, G, B data mixed with gamma data.

The controller, column driver ICs and scan driver ICs have configuration for performing encoding and decoding for RSDS, LVDS or TMDS signals, and thus transmit and receive data including R, G, B data and gamma data in a differential signaling system.

DETAILED DESCRIPTION OF THE INVENTION

Figure 1:
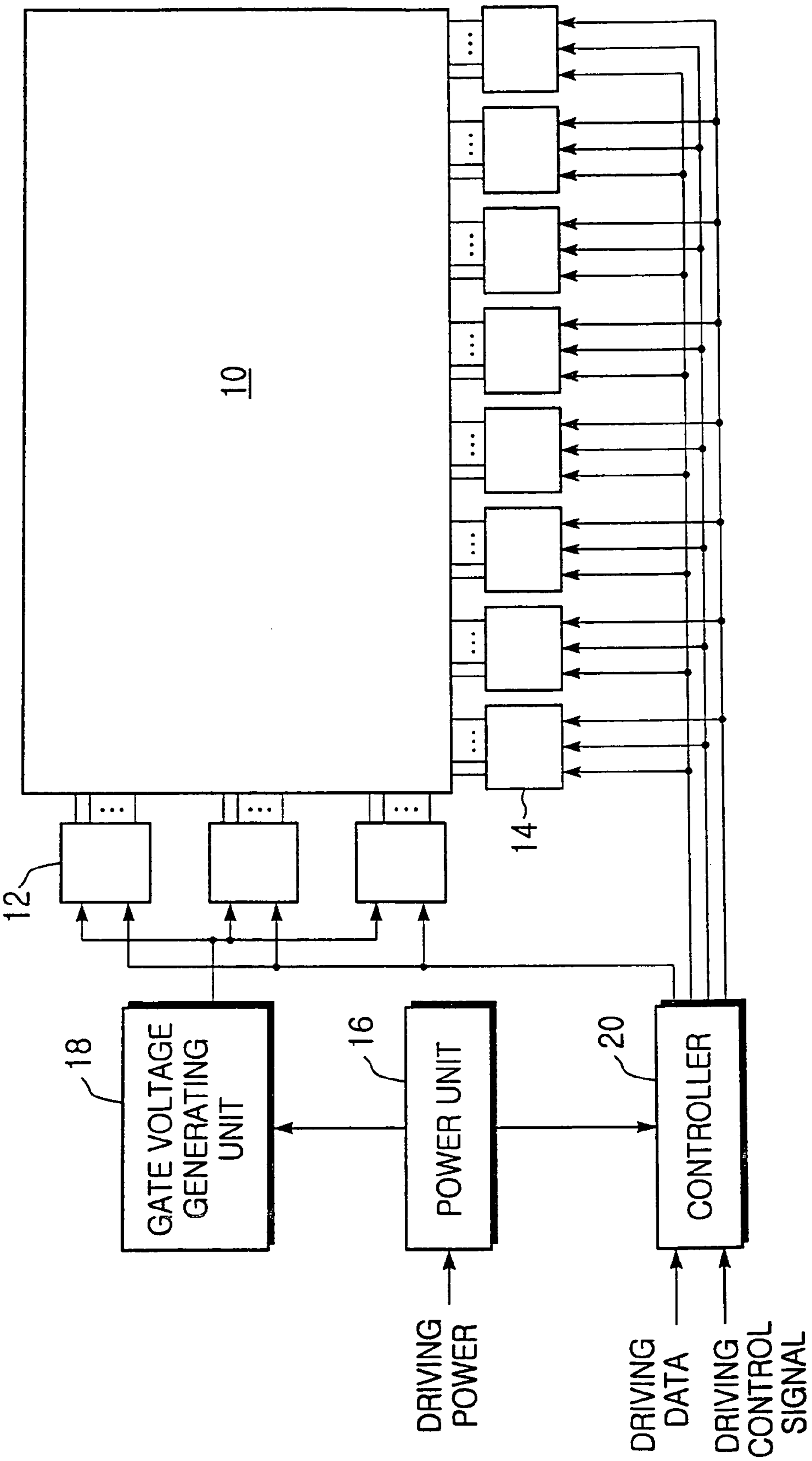
FIG. 1 illustrates a flat panel display according to an embodiment of the present invention.

A flat panel display according to the present invention will be explained with reference to the attached drawings.

The flat panel display according to the present invention as illustrated throughout the specification is for a liquid crystal display with a liquid crystal display panel. An embodiment of the present invention considers the case where R, G, B data is expressed in 6-bits per color. Therefore, gamma data have values for expressing 64 gradations.

In other words, if gamma data have gradation data $(000000)_2$ for expressing the lowest luminance, the gradation data for expressing the highest luminance is $(111111)_2$.

In an embodiment of the present invention, a liquid crystal panel 10 to which a scan signal and a column signal are applied so as to display a predetermined image, has a plurality of scan driver ICs 12 arranged in a vertical direction and a plurality of column driver ICs 14. The number of scan driver ICs and column driver ICs depends on the size and resolution of the liquid crystal panel. Scan driver ICs 12 are arranged to supply a scan signal to the liquid crystal panel 10, column driver ICs 14 are arranged to supply a column signal to the liquid crystal panel 10. The liquid crystal panel 10 operates when the scan signal is applied to the gate of thin film transistor (not shown) arranged for each pixel and the column signal is applied to a source.

A driving power with a constant voltage is fed to a power unit 16, which generates DC voltages of different level and supply the DC voltage to a gate voltage generating unit 18 and a controller 20, respectively.

The gate voltage generating unit is arranged to generate a gate on/off voltage utilizing the DC voltage and supply the voltage to scan driver ICs. The controller is arranged to control the timing format of data by utilizing a driving data and a driving control signal, generate a scan control signal and a column control signal, and at the same time generate gamma data by utilizing a reference voltage supplied from the power unit. The controller 20 applies the scan control signal to scan driver ICs 12, and data, column control signal and gamma data to column driver ICs 14.

Figure 2:
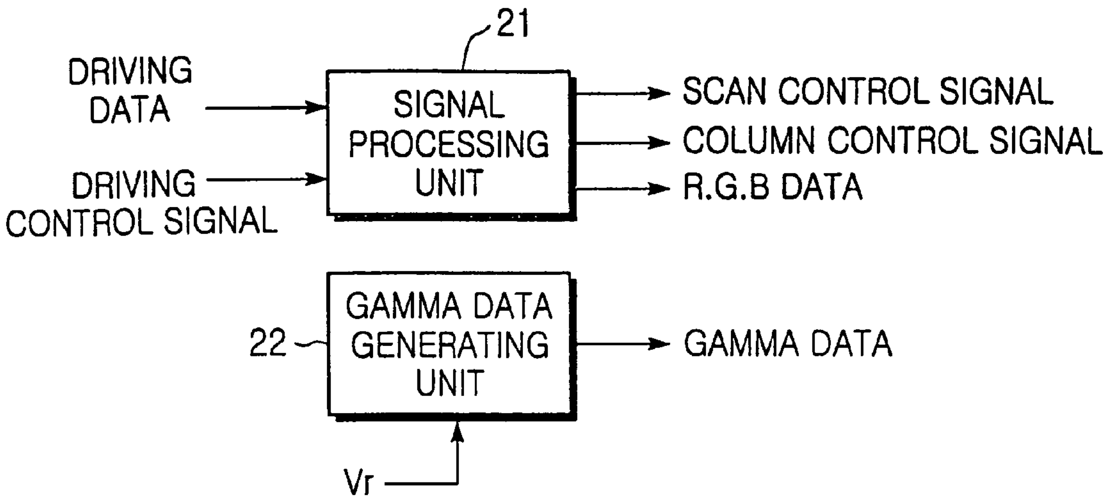
FIG. 2 is a block diagram illustrating a first embodiment of a controller according to the present invention.
Figure 3:
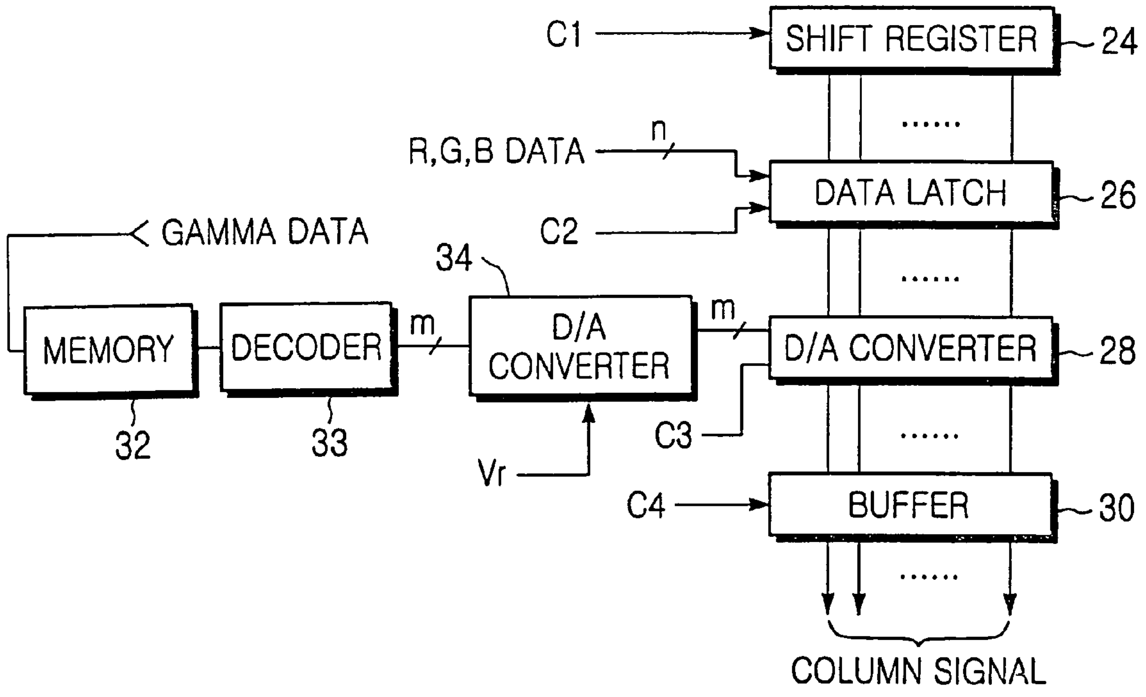
FIG. 3 is a block diagram illustrating a first embodiment of a column driver IC according to another embodiment of the present invention.
Figure 4:
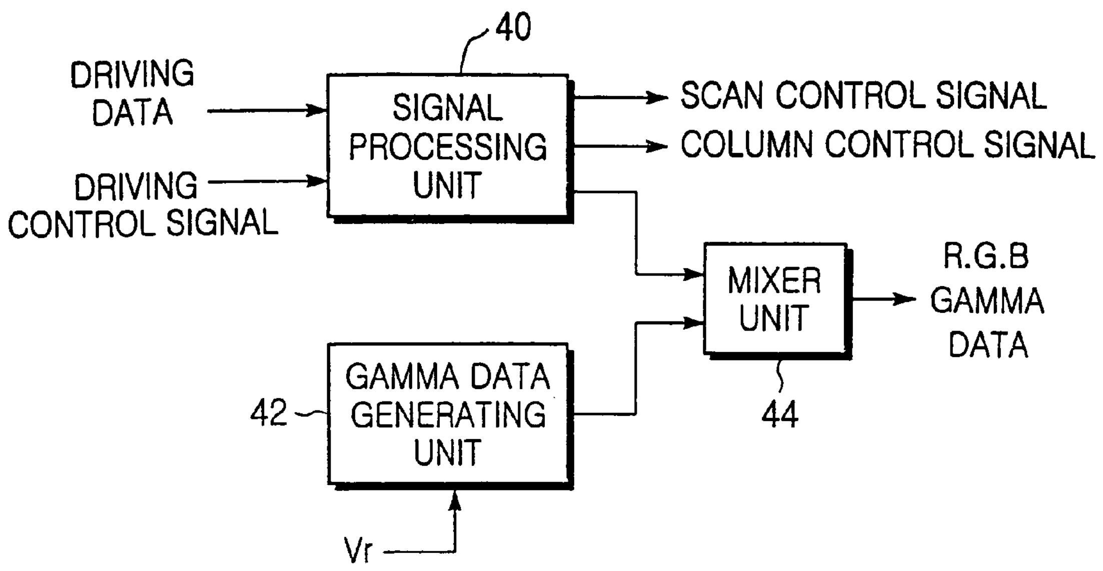
FIG. 4 is a block diagram illustrating a second embodiment of a controller according to the present invention.
Figure 5:
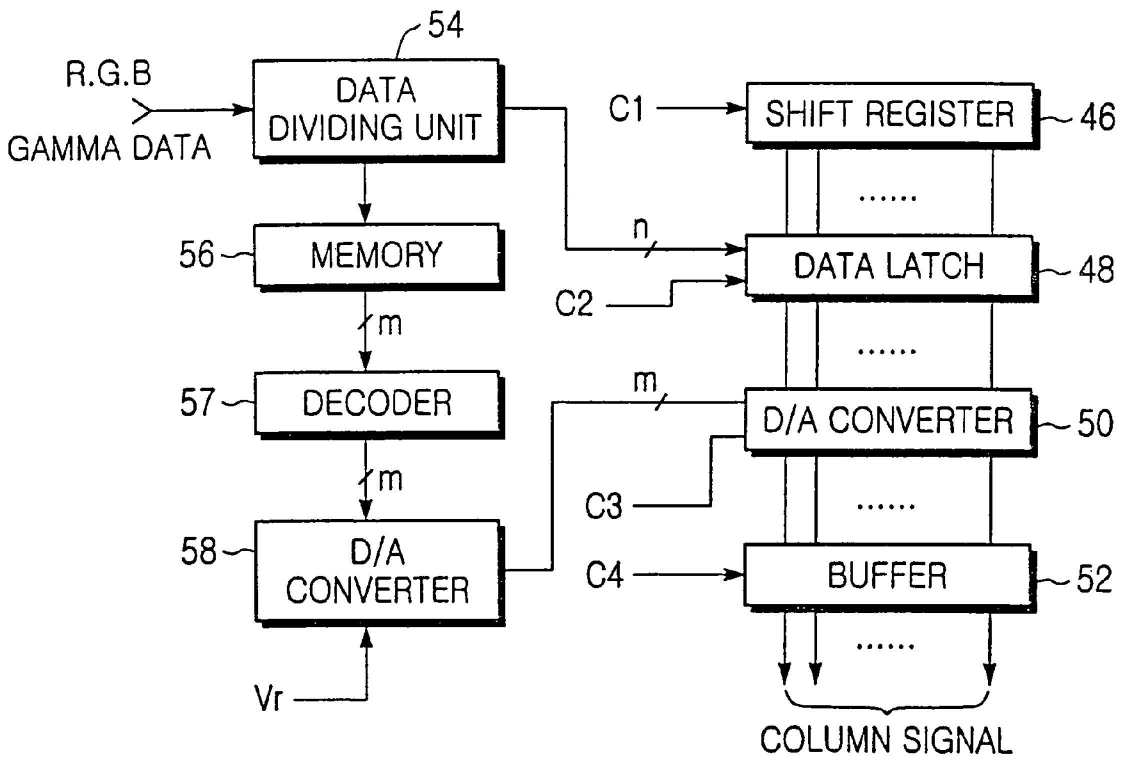
FIG. 5 is a block diagram illustrating a second embodiment of a column driver IC according to the present invention.
Figure 7:
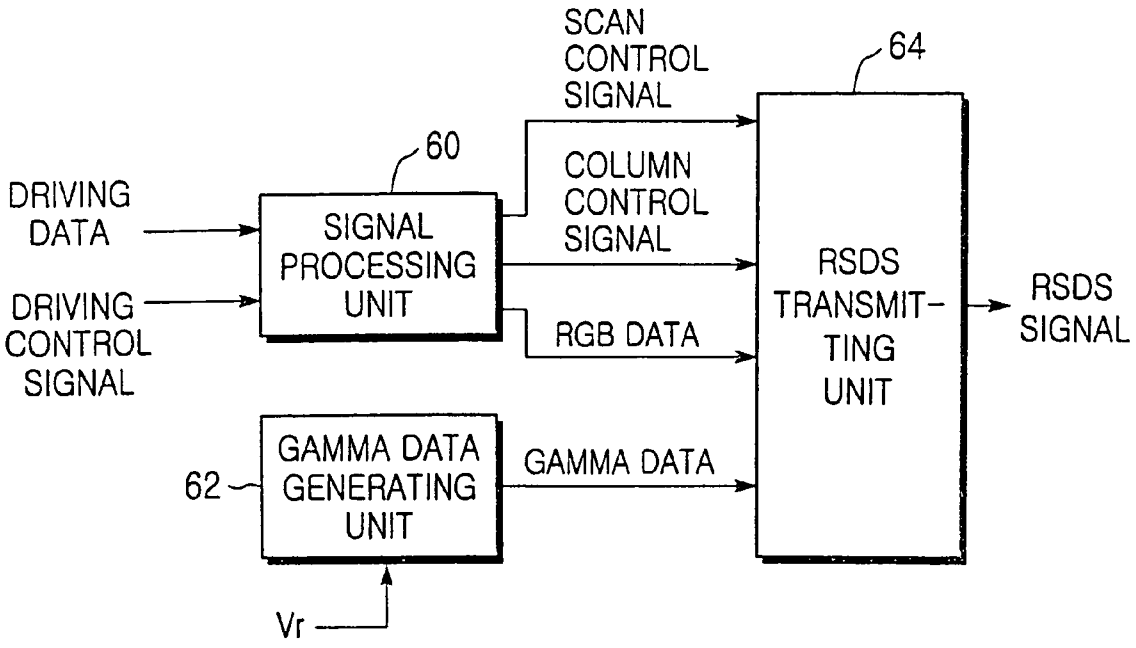
FIG. 7 is a block diagram illustrating a third embodiment of a controller.
Figure 8:
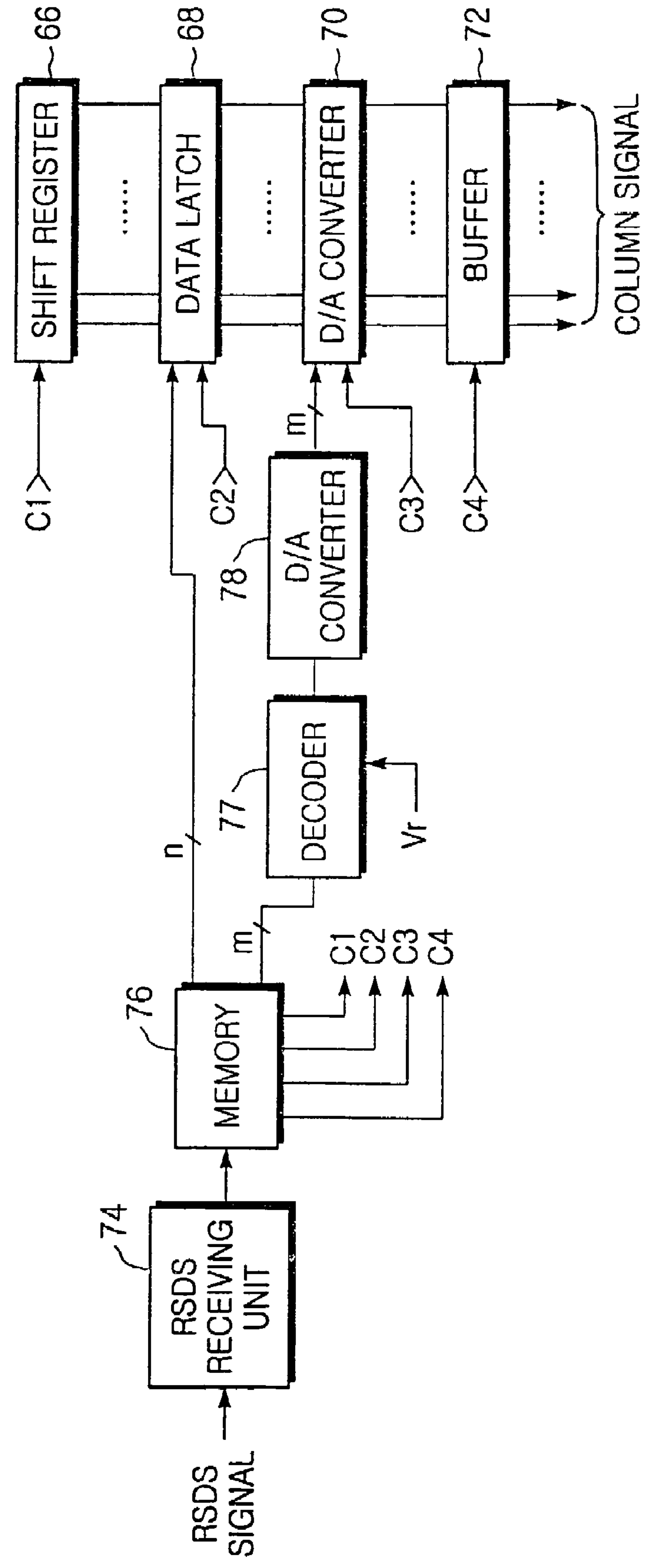
FIG. 8 is a block diagram illustrating a third embodiment of a column driver IC.

The controller 20 and column driver ICs 14 have configuration of a first embodiment as shown in FIGS. 2 and 3, a second embodiment as shown in FIGS. 4 and 5, and a third embodiment as shown in FIGS. 7 and 8.

The first embodiment adopts TTL system where R, G, B data and gamma data are transmitted through a separate transmission line. The second embodiment adopts TTL system where R, G, B data are transmitted with gamma data intermingled in the blanking section of R, G, B data. The third embodiment is for the case of differential signaling system where R, G, B data and gamma data are transmitted in RSDS system.

As the first embodiment, the controller 20 has a configuration shown in FIG. 2.

The controller 20 includes a signal processing unit 21 and a gamma data generating unit 22. The signal processing unit 21 takes, as an input, driving data and a driving control signal, controls timing format of the driving data and outputs the result in R, G, B data. At the same time, the signal processing unit 21 generates and outputs a scan control signal and a column control signal. The gamma data generating unit 22 generates and outputs digitized gamma data referring to a reference voltage applied from the power unit 16 so as to execute a plurality of gradation operation. Here, the scale of gamma data changes depending on the level of the reference voltage.

Since R, G, B data are 6-bits, respectively, gamma data is output in 6-bits for 64 gradations. Here, gamma data has digitized data value such as $(000000)_2$, $(000001)_2$, . . . $(111111)_2$, for determining the level of gradation voltage.

As described above, the column control signal, R, G, B data, and gamma data output from the controller 20 with the configuration of the first embodiment, are input to column driver ICs 14 of FIG. 3. Here, the column control signal includes a shift register control signal C1, a data latch control signal C2, a D/A converter control signal C3, and a buffer control signal C4. Here, R, G, B data and gamma data have n-bit and m-bit (wherein, n and m are arbitrary natural numbers, and n is 18 and m is 6 in the present embodiment), and input to column driver ICs 14 through a separate TTL system signal transmission line.

Column driver ICs 14 include a shift register 24, a data latch 26, a D/A converter 28 and a buffer 30. The shift register 24 has an output is shifted by control signal C1 And n-bit R, G, B data transmitted from the controller 20 are sequentially stored into each of latches constituting a data latch 26 in accordance with the order of shifting the output of the shift register 24. The latched data is output to a D/A converter 28 in accordance with control signal C2. The D/A converter 28 selects gradation voltage corresponding to each pixel value of R, G, B data and outputs the result to a buffer 30 in accordance with control signal C3. The buffer 30 outputs the buffered signal as a column signal in accordance with control signal C4.

Here, the gamma data is temporarily stored in a memory 32, output to a decoder 33 through m-bit line, and decoded. The decoded gamma data is output to a D/A converter 34 which is arranged to output, the gradation voltage having electric potential corresponding to the value of gamma data to the D/A converter 28.

Therefore, in the first embodiment, column signal is generated from column driver ICs 14 and fed to the liquid crystal panel 10 by R, G, B data, gamma data and the column control signal transmitted from the controller 20.

Here, the number of wires required for transmitting the gamma data from the controller 20 to column driver ICs 14 is similar to those for transmitting m-bit data in TTL system. Therefore, the number of wires mounted onto a control board in a practical application can be significantly reduced. Since gamma data is transmitted to column driver ICs 14, and gradation voltage is generated at column driver ICs 14 by the value of gamma data and utilized in generating column signals, the value of gradation applied to the liquid crystal panel is more accurate than the case where the remotely transmitted gradation voltage is applied, thereby obtaining a higher quality screen.

The second embodiment is for the case where gamma data is mixed to the blanking section of R, G, B data and transmitted.

To this end, the controller 20 includes a signal processing unit 40, a gamma data generating unit 42 and a mixer unit 44, as shown in FIG. 4.

Here, the signal processing unit 40 takes, as an input, driving data and a driving control signal, controls the timing format of the driving data, outputs the result in R, G, B data, and generates and outputs a scan control signal and a column control signal.

The gamma data generating unit 42 generates and outputs digitized gamma data with reference to a reference voltage applied from the power unit 16 so as to execute a plurality of gradation operation.

The mixer unit 44 is arranged to mix R, G, B data of the signal processing unit 40 and gamma data of the gamma data generating unit 42, and output the mixture. Here, gamma data is output in 6-bits for 64-gradations, and the mixer unit 44 mixes gamma data with the blanking section of R, G, B data and outputs the mixture to column driver ICs 14.

Figure 6:
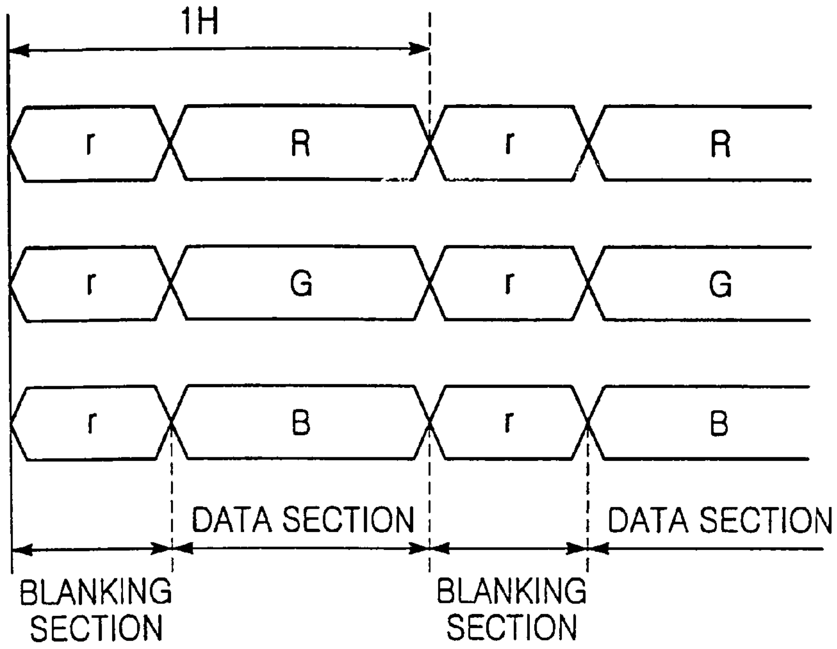
FIG. 6 illustrates waveform of data transmission where R, G, B data is mixed with gamma data.

In more detail, R, G, B data for displaying image in the liquid crystal panel 10 is transmitted in series in the order of scan lines, and the blanking section exists among R, G, B data in scan line units, as shown in FIG. 6. If the section of scan line unit is a horizontal section (1H), the horizontal section can be divided into a data section where data for realizing each color by scan line units for each of R, G, B exists, and a blanking section where such data does not exist. The mixer unit 44 mixes gamma data to the blanking section, as shown in FIG. 6.

R, G, B data including gamma data, scan control signals and column control signals are transmitted in TTL system through the wire corresponding to the relevant bits.

The column control signal, R, G, B data, gamma data output from the controller 20 according to the configuration of the second embodiment of the present invention are input to column driver ICs 14, as shown in FIG. 5. Here, the column control signal includes the shift register control signal C1, data latch control signal C2, D/A converter control signal C3 and the buffer control signal C4.

Column driver ICs 14 include a shift register 46, a data latch 48, a D/A converter 50 and a buffer 52. The configuration and operation of those components are the same as those of the first embodiment, and detailed description thereof will be omitted.

Column driver ICs 14 of the second embodiment of the present invention further includes a data dividing unit 54, a memory 56, a decoder 57 and a D/A converter 58. The data dividing unit 54 divides R, G, B data and gamma data mixed to the blanking section thereof, and inputs n-bit R, G, B data to the data latch 48 and the separated gamma data to the memory 56.

The memory 56 is arranged to output the input m-bit gamma data to the decoder 57, and the decoder 57 is arranged to decode the input gamma data and output the decoded gamma data to the D/A converter 58. The D/A converter 58 then converts the decoded gamma data into an analog gradation voltage corresponding to the value of gamma data having digital value with reference to a constant voltage Vr and outputs the result to the D/A converter 50.

In the second embodiment, column signal is generated from column driver ICs 14 by utilizing R, G, B data, gamma data and the column control signal transmitted from the controller 20, and supplied to the liquid crystal panel 10.

Since gamma data is transmitted from the controller 20 to column driver ICs 14 through the wire for transmitting R, G, B data, an additional arrangement for the wiring for transmitting gamma data is not required. Therefore, the volume of wires mounted onto a control board in a practical application can be substantially reduced. Like the first embodiment, the value of gradation applied to the liquid crystal panel is more accurate than the case where the remotely transmitted gradation voltage is applied, obtaining a higher quality screen.

In the third embodiment, the controller 20 encodes R, G, B data, gamma data and control signal in RSDS system signal and transmits the result, column driver ICs 14 receive the RSDS system signal, decode the received signal and output a scan signal. While RSDS system is illustrated in the third embodiment, as one of the approaches for differential signaling, it should be understood that LVDS or TMDS system can also be employed depending on the specification of the manufacturer who understands the technical idea of the present invention. This can be performed by employing different transmitting means and receiving means.

The controller 20 of the third embodiment of the present invention includes a signal processing unit 60, a gamma data generating unit 62 and an RSDS system transmitting unit 64 as shown in FIG. 7.

The signal processing unit 60 is arranged to receive the driving data and driving control signal, control the timing format of the driving data, output the result in R, G, B data, and generate and output a scan control signal and a column control signal. The gamma data generating unit 62 generates and outputs digitized gamma data with reference to a reference voltage applied from the power unit 16 so as to execute a plurality of gradation operation. The signal processing unit 60 and the gamma data generating unit 62 output TTL system signal.

The RSDS transmitting unit 64 encodes in RSDS system the scan control signal, column control signal and R, G, B data of the signal processing unit 60 and gamma data of the gamma data generating unit 62, and outputs RSDS signal to column driver ICs 14.

The RSDS transmitting unit 64 has at an input side thereof a port that allows the scan control signal, column control signal, R, G, B data and gamma data to be inputted though the wiring where TTL signals are allocated in bits, and at an output side thereof a pair of wires for transmitting a differential signal, which are arranged in such a manner that the pair constitutes a single output channel and RDSD signal can be output through a plurality of channels. Here, input bit versus output channel is approximately multiple to one (say, 7:1), and the input port of several tens of bits corresponds to a couple of channels.

The above-described scan control signal, column control signal, R, G, B data and gamma data are output in RSDS signal from the RSDS transmitting unit 64 to column driver ICs 14 through a plurality of channels.

The RSDS signal including column control signal, R, G, B data and gamma data output from the controller 20 is input to column driver ICs 14 configured as shown in FIG. 8.

Column driver ICs 14 include a shift register 66, a data latch 68, a D/A converter 70 and a buffer 72. The configuration and operation of those components are the same as those described with reference to the first and second embodiments, and detailed description thereof will be omitted.

Column driver ICs 14 of the third embodiment of the present invention includes an RSDS receiving unit 74, a memory 76, a decoder 77 and a D/A converter 78.

The RSDS receiving unit 74 decodes in TTL system the RSDS signal transmitted from the controller 20, and stores a column control signal, R, G, B data and gamma data into the memory 76. Here, the column control signal includes the shift register control signal C1, data latch control signal C2, D/A converter control signal C3 and the buffer control signal C4.

Each of control signals C1, C2, C3 and C4 from among the data stored in the memory 76, is applied to the corresponding component. Accordingly, the shift register 66, data latch 68, D/A converter 70 and the buffer 72 operate like those of the first and second embodiments and output a column signal.

Here, R, G, B data required for the data latch 68 are supplied from the memory, while the gradation voltage required for the D/A converter 70 is supplied from the D/A converter 78.

The D/A converter 78 converts the value of gamma data of the memory 76 decoded by the decoder 77 and input with m-bit digital value, into the corresponding analog gradation voltage, and outputs the result.

Therefore, in the third embodiment, column driver ICs 14 generate a column signal by utilizing the RSDS signal transmitted from the controller 20. Thus-generated column signal is fed to the liquid crystal panel 10.

Here, since the column control signal, R, G, B data and gamma data are transmitted in RSDS signal from the data controller 20 to column driver ICs 14, the volume of wires mounted onto a control board in a practical application can be significantly reduced. In addition, like first and second embodiments, the value of gradation applied to the liquid crystal panel is more accurate than the case where the remotely transmitted gradation voltage is applied, to thereby obtain a higher quality screen.

The present invention has the advantageous feature in that the number of transmission line can be reduced since column driver ICs generate the gradation voltage by utilizing gamma data produced from the controller and output a column signal. As a consequence, a control board can be configured in an easy manner while at the same time reducing manufacturing costs. Further, other advantages such as a high precision image representation, low power consumption, and high-speed data transmission can be obtained while at the same time eliminating EMI trouble.

What is claimed as:

1. A flat panel display, comprising:

a power unit operable to generate a constant voltage;

a gate voltage generating unit operable to generate a gate on/off voltage;

a controller operable to generate scan and column control signals, and digital gamma data representing a plurality of values for gradation and to output RGB data externally received, the scan and column control signals, and the digital gamma data, respectively;

a scan driver unit operable to receive the scan control signal and the gate on/off voltage and to generate a scan signal;

a column driver unit operable to convert the digital gamma data into an analog gradation voltage and to generate a column signal based on the column control signal, the RGB data and the analog gradation voltage; and a flat display panel operable to display an image based on the scan and column signals.

2. The flat panel display of claim 1, wherein the controller transmits the RGB data of a plurality of bits and the digital gamma data of a plurality of bits to the column driver unit through different transmission lines, respectively.

3. The flat panel display of claim 2, wherein the column driver unit comprises a plurality of column driver integrated circuits ("IC"), each of the column driver ICs comprising:

a memory storing the digital gamma data, a decoder decoding the digital gamma data stored in the memory;

a first digital/analog ("D/A") convener converting the decoded digital gamma data into an analog gradation voltage;

a shift register sequentially shifting an output;

a data latch storing the RGB data from the controller and outputting the stored RGB data in accordance with the output from the shift register;

a second D/A converter receiving the analog gradation voltage from the first D/A converter and the RGB data from the data latch, selecting the gradation value corresponding to the RGB data from the data latch and generating a gradation voltage based on the selecting gradation value; and a buffer buffering the gradation voltage from the second D/A converter and generating the column signal.

4. A flat panel display, comprising:

a power unit generating a constant voltage;

a gate voltage generating unit generating a gate on/off voltage;

a controller receiving driving data and a driving control signal and generating a scan control signal, a column control signal, RGB data and digital gamma data having a plurality of gradation values with reference to the constant voltage from the power unit, wherein the controller encodes the scan control signal, the column control signal, the RGB data in a differential signal format;

a scan driver unit decoding the differential signal and generating a scan signal based on the scan control signal and the gate on/off voltage;

a column driver unit decoding the differential signal, converting the digital gamma data into an analog gradation voltage, and outputting a column signal based on the column control signal, RGB data and the analog gradation voltage; and a flat display panel displaying an image based on the scan signal and the column signal.

5. The flat panel display of claim 4, wherein the controller comprises:

a signal processing unit receiving the driving data and the driving control signal and generating the RGB data, the scan control signal and the column control signal;

a gamma data generating unit generating the digital gamma data with reference to the constant voltage from the power unit; and a differential signal transmitting unit encoding the scan control signal, the column control signal, the RGB data and the digital gamma data in the differential signal format.

6. The flat panel display of claim 5, wherein the column driver unit comprises a plurality of column driver integrated circuits ("IC"), each of the column driver ICs comprising;

a differential signal receiving unit decoding the differential signal;

a memory storing the decoded column control signal, the RGB data and the digital gamma data;

a decoder decoding the digital gamma data stored in the memory;

a first digital/analog ("D/A") converter converting the decoded digital gamma data into an analog gradation voltage;

a shift register sequentially shifting a timing pulse;

a data latch storing the RGB data from the memory and outputting the RGB data according to the timing pulse from the shift register;

a second D/A converter receiving the analog gradation voltage from the first D/A converter and the RGB data from the data latch, selecting the gradation value corresponding to the RGB data from the data latch and generating a gradation voltage based on the selected gradation value; and a buffer buffering the gradation voltage output from the second D/A converter and outputting the column signal.

7. The flat panel display of claim 4, wherein the differential signal is an RSDS signal.

8. The flat panel display of claim 4, wherein the differential signal is an LVDS signal.

9. The flat panel display of claim 4, wherein the differential signal is a TMDS signal.

10. The flat panel display of claim 5, wherein the differential signal is an RSDS signal.

11. The flat panel display of claim 5, wherein the differential signal is an LVDS signal.

12. The flat panel display of claim 5, wherein the differential signal is a TMDS signal.

13. The flat panel display of claim 6, wherein the differential signal is an RSDS signal.

14. The flat panel display of claim 6, wherein the differential signal is an LVDS signal.

15. The flat panel display of claim 6, wherein the differential signal is a TMDS signal.

16. A controller for a display device comprising:

a signal processing unit receiving driving data and a driving control signal, generating scan and column control signals, and outputting RGB data externally received, the scan and column control signals, respectively; and a gamma data generating unit generating digital gamma data representing a plurality of values for gradation with reference to a constant voltage from a power unit.

17. A column driver unit for a display device, comprising a plurality of column driver integrated circuits ("IC"), each of the column driver ICs comprising:

a memory storing digital gamma data from a controller;

a decoder decoding the digital gamma data stored in the memory;

a first digital/analog ("D/A") converter converting the decoded digital gamma data into an analog gradation voltage;

a shift register sequentially shifting an output;

a data latch storing RGB data from the controller and outputting the stored RGB data in accordance with the output from the shift register;

a second D/A converter receiving the analog gradation voltage from the first D/A converter and the RGB data from the data latch, selecting a gradation value corresponding to the RGB data from the data latch and generating a gradation voltage based on the selecting gradation value; and a buffer buffering the gradation voltage from the second D/A convener and generating a column signal.

* * * * *